Patented May 10, 1932

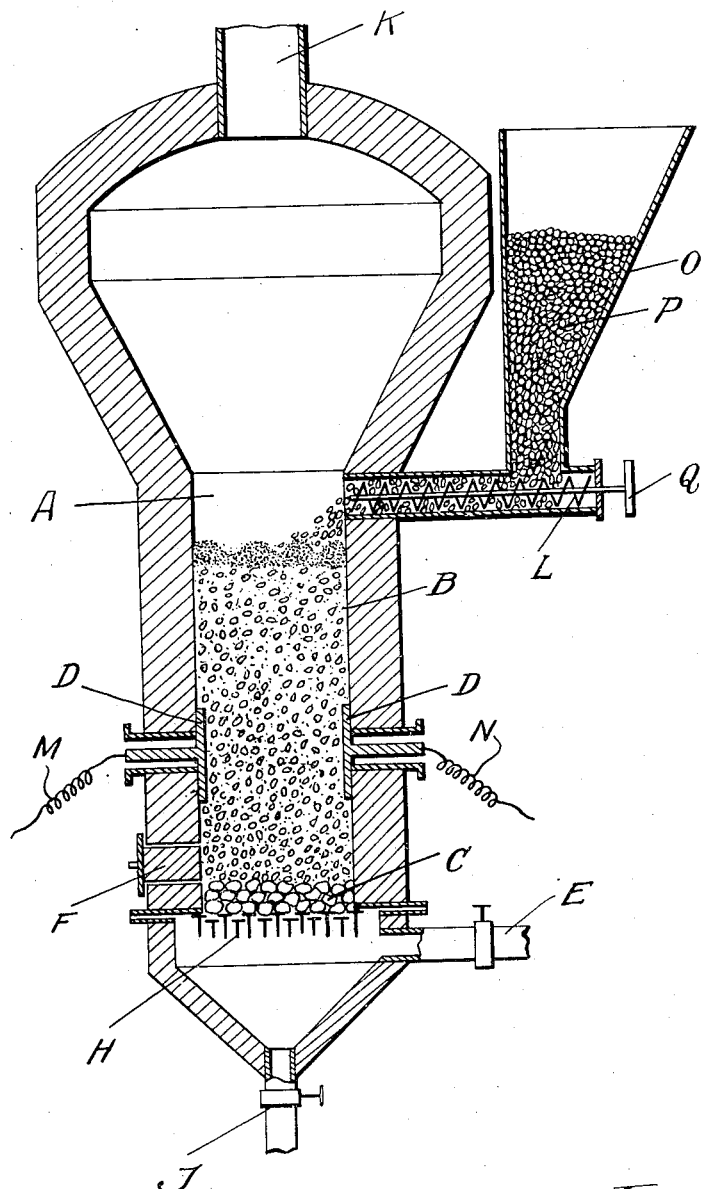

1,857,799

UNITED STATES PATENT OFFICE

FRITZ WINKLER, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PRODUCTION OF WATER GAS

Application filed June 26, 1926, Serial No. 118,849, and in Germany July 1, 1925.

I have found that granular material can be heated very uniformly by means of electric resistance or arc heating by forcing gases through the material which is arranged between two electrodes during the heating process, so as to permanently maintain the material in a state of agitation. The material is thereby heated very uniformly and any risk of local superheating of the granular material and of the electrodes is avoided.

The process according to my present application, which is a continuation-in-part of my copending application, Ser. No. 665,221, filed September 27, 1923, now Patent No. 1,687,118 is especially suitable for the treatment of materials in grains most of which are between 1 and 10 millimetres in size. It may be employed for example for the continuous production of water gas from granular fuel or for the preparation of carbon disulfide from sulfur and granular coal; also contact masses may be heated in the said manner. The process may also be carried out when operating under elevated pressures. An apparatus for carrying out the process according to the present invention is illustrated in vertical cross section in the accompanying drawing.

A is a water gas generator in the form of a vertical shaft. O is a hopper for the introduction of granular fuel indicated by P. L is a conveyor worm for pasisng the fuel from the hopper into the generator. The said conveyor worm is actuated by the driving wheel Q. H is a grate for supporting the fuel to be gasified in said generator. C is a layer of granulated fire clay, permeable to gases and resting on said grate. B is the layer of fuel to be gasified. D are electrodes of chromium-nickel steel, and M and N are electric connections. F is a plug for closing the opening for removal of slag. E is a pipe for the introduction of steam or other gasifying agent. K is an opening for the removal of the gases formed. An outlet valve for controlling removal of ashes is shown at J.

The following example will further illustrate how my invention may be carried out in practice, but the invention is not limited to this example.

In the vertical water gas generator A having a cross-sectional area of 729 square centimetres a layer B of about 60 centimetres, height of granular incandescent coke made from lignite, most of the grains of which have a size of between 1 and 10 millimetres, is placed on a layer of granulated fire clay C permeable to gases. Two electrodes D consisting of highly alloyed chromium nickel steel and having a surface of 27 x 20 centimetres = 540 square centimetres each, are arranged 20 centimetres apart in the layer of coke. Steam superheated to about 250° C. is introduced by means of pipe E into the fuel bed in such a quantity as to effect mixing and agitation of the coke, which agitation comprises a boiling action of the material as clearly shown and described in my Patent No. 1,687,118. An alternating current of 380 volts is connected with the electrodes, when about 80 amperes pass through the coke which is thereby rapidly heated to about 750° C. By the reaction of the steam with the incandescent coke, water gas containing about 23 per cent of carbondioxid, 8 per cent of carbon monoxid, 62 per cent of hydrogen, 2 per cent of methane and 5 per cent of nitrogen is formed. Thereupon the quantity of steam is increased so that at the said voltage about 60 amperes pass through the coke. The temperature falls to about 650° C., which temperature is then maintained. Under these conditions about 20 cubic metres of water gas consisting of about 30 per cent of carbon dioxid, 0.5 per cent of carbon monoxid, 63 per cent of hydrogen, 2.2 per cent of methane and 4.3 per cent of nitrogen are produced per hour. The water gas carries along the bulk of the fine ashes separated off from the coke particles by the agitation, while the coarse slag sinks down in the agitated coke and deposits on the fire-clay below the electrodes, from whence it is removed at intervals through the opening having the plug F. No ashes and slag are separated between the electrodes as would be the case with the coke bed at rest.

In a similar manner granular materials can be uniformly heated by means of the electric arc. In this manner of operation the arc is preferably produced at the surface of the agitated granular material. This process has the great advantage of allowing materials which are poor or no conductors of electric current, to be uniformly heated electrically.

I claim:

1. The process of producing water gas which comprises electrically heating a deep layer of small-sized coke from lignite, supported on a grate, by supplying an electric current to electrodes arranged within the layer of coke, and passing steam through the said layer with sufficient speed to establish a boiling action in the coke and thereby generating water gas.

2. The process of producing water gas which comprises electrically heating a deep layer of granular coke from lignite to incandescence, most of the particles of which have a grain-size of between 1 and 10 millimetres, supported on a grate, by supplying an electric current to electrodes arranged within the layer of coke, and passing steam through the said layer with sufficient speed to establish a boiling action in the incandescent coke and thereby generating water gas.

3. The process of producing water gas which comprises electrically heating a deep layer of granular coke from lignite to incandescence, most of the particles of which have a grain-size of between 1 and 10 millimetres, supported on a grate, by supplying an electric current to electrodes arranged within the layer of coke about 20 centimetres apart, and passing steam through the said layer with sufficient speed to establish a boiling action in said incandescent coke and thereby generating water gas.

In testimony whereof I have hereunto set my hand.

FRITZ WINKLER.